United States Patent
Nguyen et al.

(10) Patent No.: US 11,474,010 B2
(45) Date of Patent: Oct. 18, 2022

(54) SYSTEM AND METHOD TO DETERMINE FATIGUE LIFE OF DRILLING COMPONENTS

(71) Applicant: HALLIBURTON ENERGY SERVICES, INC., Houston, TX (US)

(72) Inventors: Minh Dang Nguyen, Singapore (SG); Yun Shan Ariane Wu, Singapore (SG)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 824 days.

(21) Appl. No.: 16/255,382

(22) Filed: Jan. 23, 2019

(65) Prior Publication Data

US 2020/0232893 A1  Jul. 23, 2020

(51) Int. Cl.
*G01N 3/02* (2006.01)
*E21B 47/06* (2012.01)
*E21B 47/07* (2012.01)

(52) U.S. Cl.
CPC .............. *G01N 3/02* (2013.01); *E21B 47/06* (2013.01); *E21B 47/07* (2020.05)

(58) Field of Classification Search
CPC ............ E21B 47/06; E21B 47/07; G01N 3/02
See application file for complete search history.

(56) References Cited

U.S. PATENT DOCUMENTS

| 8,504,308 | B2* | 8/2013 | Li | E21B 47/007 |
| | | | | 702/34 |
| 2011/0186353 | A1* | 8/2011 | Turner | G01H 1/003 |
| | | | | 175/40 |
| 2015/0226013 | A1* | 8/2015 | Kirkhope | G01N 3/56 |
| | | | | 702/6 |
| 2015/0315900 | A1* | 11/2015 | Liu | E21B 17/1078 |
| | | | | 175/40 |
| 2016/0047223 | A1* | 2/2016 | Li | E21B 47/007 |
| | | | | 702/9 |

(Continued)

FOREIGN PATENT DOCUMENTS

WO  2016182798 A1  11/2016

OTHER PUBLICATIONS

Chen et al. "Development of and Validating a Procedure for Drillstring Fatigue Analysis". IADC/SPE-189585-MS. IADC/SPE Drilling Conference and Exhibition. . Mar. 6-8, 2018. 19 Pages. (Year: 2018).*

(Continued)

*Primary Examiner* — Eunhee Kim
(74) *Attorney, Agent, or Firm* — Novak Druce Carroll LLP

(57) ABSTRACT

A method is provided. An actual fatigue curve limit is determined for actual stress of a drilling component based on an actual yield strength of a material of the drilling component. A plurality of drilling parameters is simulated for the drilling component to determine one or more estimated stresses enacted on the drilling component for one or more combinations of the plurality of drilling parameters. A component life cycle of the drilling component is determined based on the actual fatigue curve limit and the plurality of drilling parameters. A consumed component life of the drilling component is determined for an actual drilling step utilizing the drilling component, and a remaining life of the drilling component after the actual drilling step is determined.

20 Claims, 4 Drawing Sheets

(56) References Cited

U.S. PATENT DOCUMENTS

2018/0112512 A1\* 4/2018 Chen ................. G06F 17/11
2018/0119535 A1\* 5/2018 Shen ................. E21B 41/00

OTHER PUBLICATIONS

Suryadi et al. "Managing BHA Components Integrity with a Fatigue Management Workflow". IADC/SPE-180562-MS. IADC/SPE Asia Pacific Drilling Technology Conference. Aug. 22-24, 2016. 9 Pages. (Year: 2016).\*
Kale et al. "Methodology for Optimizing Operational Performance and Life Management of Drilling Systems Using Real Time-Data and Predictive Analytics". SPE-173419-MS. Society of Petroleum Engineers. Mar. 3-5, 2015. 16 Pages. (Year: 2015).\*
Kale, A.. , Zhang, D.. , David, A.. , Heuermann-Kuehn, L.. , and O.. Fanini. "Methodology for Optimizing Operational Performance and Life Management of Drilling Systems Using Real Time-Data and Predictive Analytics." Paper presented at the SPE Digital Energy Conference and Exhibition, Mar. 2015. (Year: 2015).\*
International Search Report and Written Opinion for PCT application No. PCT/US2019/066925, dated Apr. 20, 2020, 6 pages.

\* cited by examiner

SYSTEM AND METHOD TO DETERMINE FATIGUE LIFE OF DRILLING COMPONENTS

FIELD

The present disclosure relates generally to systems and methods to determine fatigue life of drilling components. In at least one example, the present disclosure relates to systems and methods to determining fatigue life of drilling components to maximize usage of the drilling components.

BACKGROUND

In order to produce oil or gas, a well is drilled into a subterranean formation, which may contain a hydrocarbon reservoir or may be adjacent to a reservoir. Many drilling components may be utilized to drill a well such as drill collars, drill bits, and downhole tools. During drilling, the drilling components may experience stresses which cause wear and tear on the drilling components, leading to the need for replacing the drilling components. Each drilling component may have different life spans before needing replacement, as each drilling component may experience different stresses and/or be made of different material.

BRIEF DESCRIPTION OF THE DRAWINGS

Implementations of the present technology will now be described, by way of example only, with reference to the attached figures, wherein.

DETAILED DESCRIPTION

Figure 1:
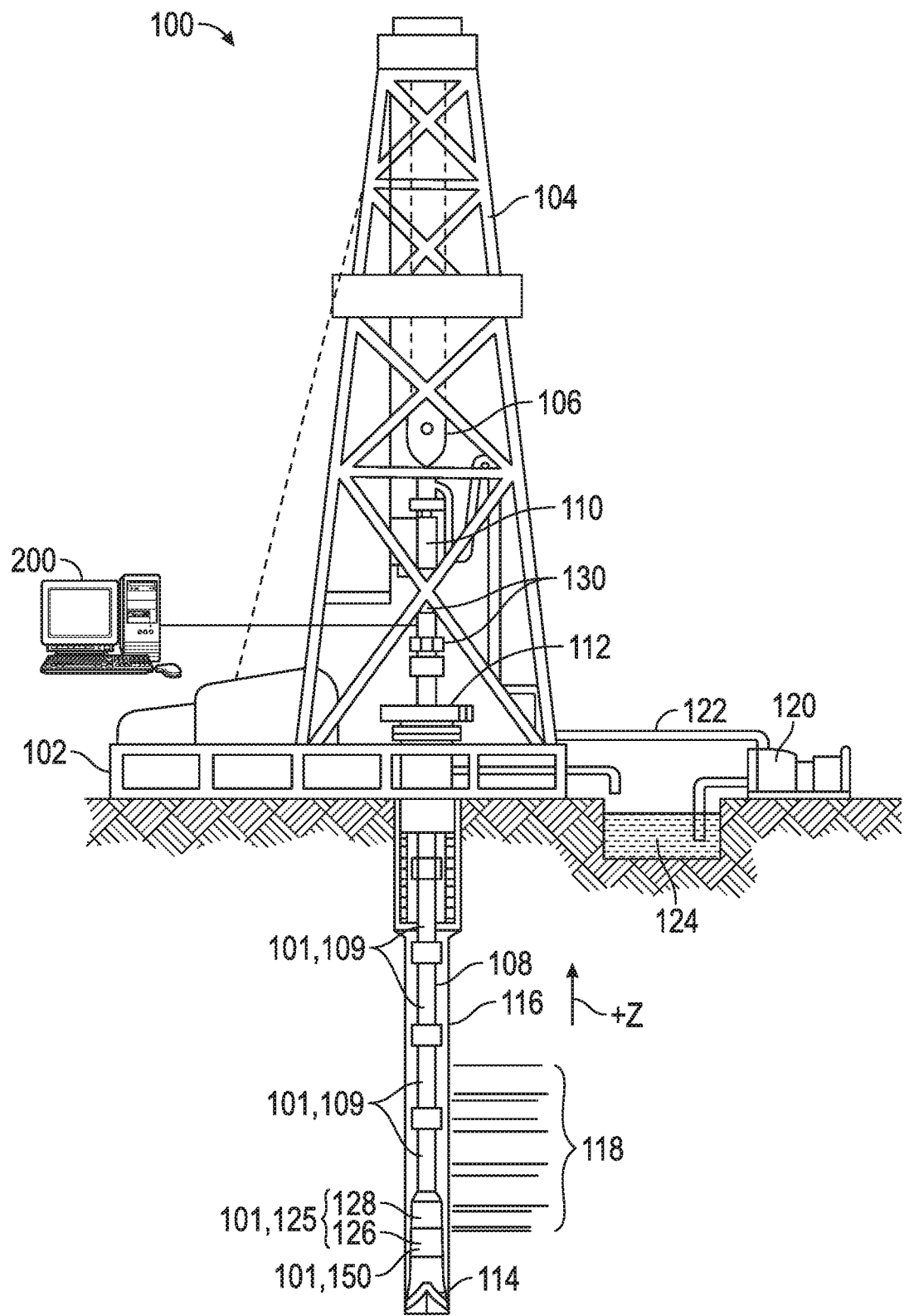
FIG. 1 is a diagram illustrating an example of an environment in which a drilling system may be used in accordance with the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Disclosed herein is a system and method to determine fatigue life of drilling components. An actual fatigue curve limit for actual stress of a drilling component is determined based on actual yield strength of a material of the drilling component. By utilizing the actual yield strength and not an estimate of yield strength of the material, the fatigue curve limit is more accurate, and thereby provides a more accurate determination of the component life cycle. The actual yield strength, for example, can be provided by the manufacturer of the drilling component and depends on the precise materials that are used in creating the drilling component. A drilling component may be any device, sensor or tool along a drill string including drill bits, housings, collars, stabilizers, anti-rotation devices, sensors, or other components Drilling is simulated in order to estimate a plurality of drilling parameters for the drilling component. By utilizing a plurality of drilling parameters, the determination of the component life cycle is more accurate.

A component life cycle is then determined for the drilling component based on the actual fatigue curve limit and the plurality of drilling parameters. The component life cycle includes the number of simulated drilling steps the component can endure before replacement is needed. For example, a drilling step may be one standard rotation of the drilling component under a set of standard conditions.

A wellbore is drilled utilizing the drilling component and includes one or more actual drilling steps. Correspondingly, a consumed component life of the drilling component during the actual drilling step is determined. In order to determine consumed life, one or more sensors can measure the actual drilling components, for example dogleg severity, pressure, temperature, weight on bit, torque on bit, and/or rotations per minute. In at least one example, the consumed component life can be determined in real time or substantially in real time. The consumed component life may be less than, greater than, or equal to one of the simulated drilling steps of the component life cycle. With the consumed component life, a remaining life of the drilling component can be determined. For example, a simulated drilling step of the component life cycle may be considered 1, and the component life cycle of the drilling component may be 100.

After an actual drilling step, if the conditions downhole are lesser than simulated, for example lower temperature and/or lower pressure, then the consumed component life for the actual drilling step may be determined to be 0.7. As such, the remaining life of the drilling component is 99.3. This is repeated for each actual drilling step. Once the remaining life is less than a predetermined amount, for example 8 in the aforementioned example, then the drilling component may be replaced, maximizing the utilization efficiency of the drilling components. Conventionally, drilling components were preset with a certain number of running hours, and the drilling component was replaced once the number of running hours was met. The present disclosure facilitates reducing the amount of waste in asset usage associated with conventional systems because actual downhole conditions are consider. Additionally, if the conditions downhole are harsher than previously simulated, then the risk of component failure during a run is increased.

While the disclosure focuses on determining the component life cycle, consumed component life, and remaining life of one component, the system and method can be utilized to determined component life cycle, consumed component life, and remaining life of a plurality of drilling components. For example, the life of each of the plurality of drilling components can be determined simultaneously. As such, use of each drilling component can be maximized.

The disclosure now turns to FIG. 1, which illustrates a diagrammatic view of an exemplary wellbore drilling environment 100, for example a logging while drilling (LWD) and/or measurement while drilling (MWD) wellbore environment, in which the present disclosure may be implemented. As illustrated in FIG. 1, a drilling platform 102 is equipped with a derrick 104 that supports a hoist 106 for raising and lowering one or more drilling components 101 which can include, for example, a drill string 108 which can include one or more drill collars 109, a drill bit 114, and/or a bottom-hole assembly 125. The drilling components 101 are operable to drill a wellbore 116. The drilling components 101 also can include housings for one or more downhole tools. The drilling components 101 include at least one material having an actual yield strength. The actual yield strength can be determined and/or provided by the manufacturer of the drilling components 101. For example, the material of the drilling components 101 can be non-magnetic. In some examples, the material of the drilling components 101 can be stainless steel.

The hoist 106 suspends a top drive 110 suitable for rotating the drill string 108 and lowering the drill string 108 through the well head 112. Connected to the lower end of the drill string 108 is a drill bit 114. As the drill bit 114 rotates, the drill bit 114 creates a wellbore 116 that passes through various formations 118. A pump 120 circulates drilling fluid through a supply pipe 122 to top drive 110, down through the interior of drill string 108, through orifices in drill bit 114, back to the surface via the annulus around drill string 108, and into a retention pit 124. The drilling fluid transports cuttings from the wellbore 116 into the pit 124 and aids in maintaining the integrity of the wellbore 116. Various materials can be used for drilling fluid, including oil-based fluids and water-based fluids.

As illustrated in FIG. 1, sensors 126 can be provided, for example integrated into the bottom-hole assembly 125 near the drill bit 114. As the drill bit 114 extends the wellbore 116 through the formations 118, the sensors 126 can collect measurements of various drilling parameters, for example relating to various formation properties, the orientation of the drilling component(s) 101, dog leg severity, pressure, temperature, weight on bit, torque on bit, and/or rotations per minute. The sensors 126 can be any suitable sensor to measure the drilling parameters, for example transducers, fiber optic sensors, and/or surface and/or downhole sensors. The bottom-hole assembly 125 may also include a telemetry sub 128 to transfer measurement data to a surface receiver 130 and to receive commands from the surface. In some examples, the telemetry sub 128 communicates with a surface receiver 130 using mud pulse telemetry. In other examples, the telemetry sub 128 does not communicate with the surface, but rather stores logging data for later retrieval at the surface when the logging assembly is recovered. Notably, one or more of the bottom-hole assembly 125, the sensors 126, and the telemetry sub 128 may also operate using a non-conductive cable (e.g. slickline, etc.) with a local power supply, such as batteries and the like. When employing non-conductive cable, communication may be supported using, for example, wireless protocols (e.g. EM, acoustic, etc.) and/or measurements and logging data may be stored in local memory for subsequent retrieval at the surface.

Each of the sensors 126 may include a plurality of tool components, spaced apart from each other, and communicatively coupled with one or more wires. The telemetry sub 128 may include wireless telemetry or logging capabilities, or both, such as to transmit information in real time indicative of actual downhole drilling parameters to operators on the surface.

The sensors 126, for example an acoustic logging tool, may also include one or more computing devices 150 communicatively coupled with one or more of the plurality of drilling components 101. The computing device 150 may be configured to control or monitor the performance of the sensors 126, process logging data, and/or carry out the methods of the present disclosure.

In some examples, one or more of the sensors 126 may communicate with a surface receiver 130, such as a wired drillpipe. In other cases, the one or more of the sensors 126 may communicate with a surface receiver 130 by wireless signal transmission. In at least some cases, one or more of the sensors 126 may receive electrical power from a wire that extends to the surface, including wires extending through a wired drillpipe. In at least some examples the methods and techniques of the present disclosure may be performed by a controller 200, for example a computing device, on the surface. The controller 200 is discussed in further detail below in FIG. 2. In some examples, the controller 200 may be included in and/or communicatively coupled with surface receiver 130. For example, surface receiver 130 of wellbore operating environment 100 at the surface may include one or more of wireless telemetry, processor circuitry, or memory facilities, such as to support substantially real-time processing of data received from one or more of the sensors 126. In some examples, data can be processed at some time subsequent to its collection, wherein the data may be stored on the surface at surface receiver 130, stored downhole in telemetry sub 128, or both, until it is retrieved for processing.

Figure 2:
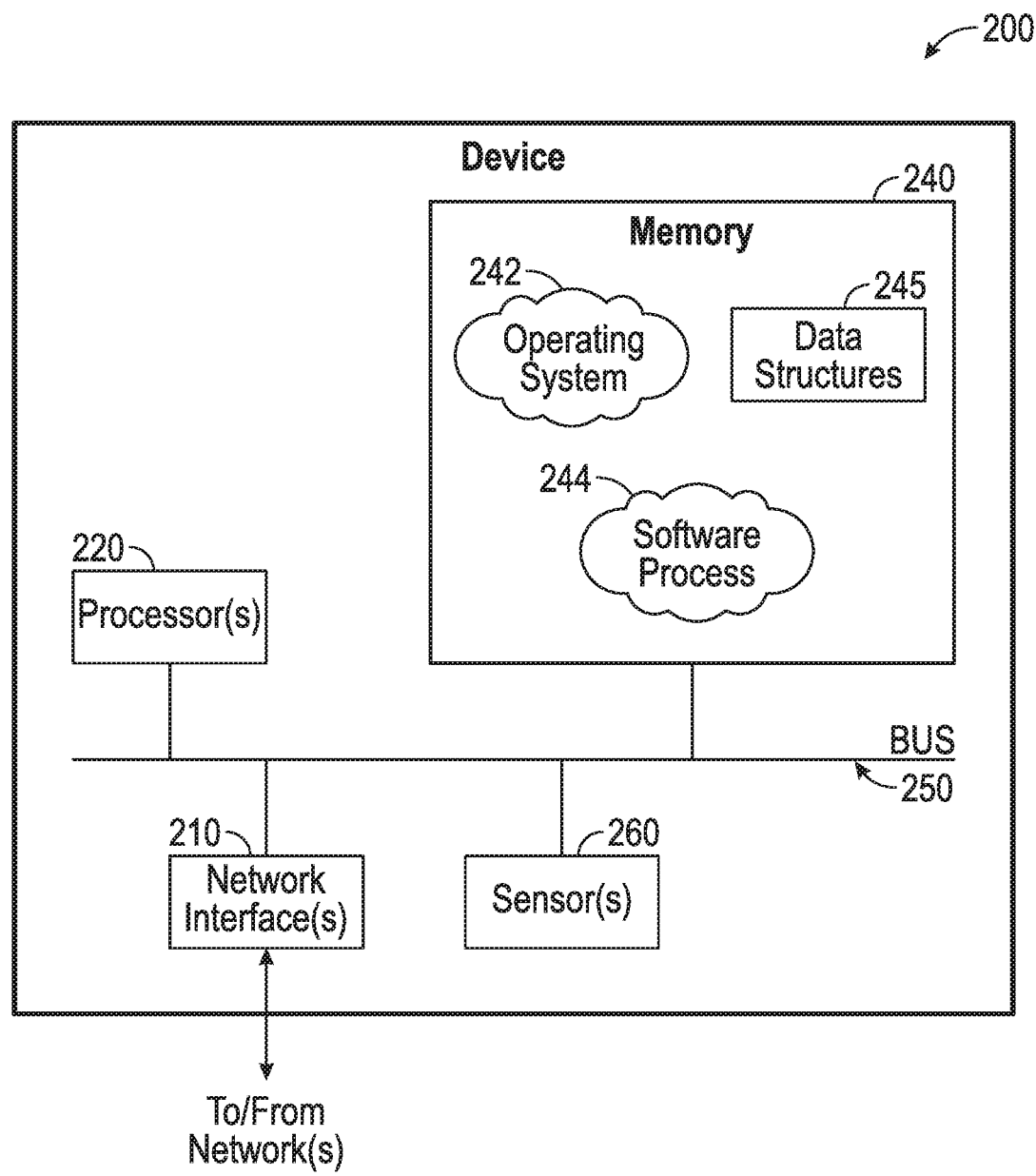
FIG. 2 is a diagram of a controller which may be employed as shown in FIG. 1.

FIG. 2 is a block diagram of an exemplary controller 200. Controller 200 is configured to perform processing of data and communicate with the drilling components 101, for example as illustrated in FIG. 1. In operation, controller 200 communicates with one or more of the above-discussed components and may also be configured to communication with remote devices/systems.

As shown, controller 200 includes hardware and software components such as network interfaces 210, at least one processor 220, sensors 260 and a memory 240 interconnected by a system bus 250. Network interface(s) 210 can include mechanical, electrical, and signaling circuitry for communicating data over communication links, which may include wired or wireless communication links. Network interfaces 210 are configured to transmit and/or receive data using a variety of different communication protocols, as will be understood by those skilled in the art.

Processor 220 represents a digital signal processor (e.g., a microprocessor, a microcontroller, or a fixed-logic processor, etc.) configured to execute instructions or logic to perform tasks in a wellbore environment. Processor 220 may include a general purpose processor, special-purpose processor (where software instructions are incorporated into the processor), a state machine, application specific integrated circuit (ASIC), a programmable gate array (PGA) including a field PGA, an individual component, a distributed group of processors, and the like. Processor 220 typically operates in conjunction with shared or dedicated hardware, including but not limited to, hardware capable of executing software and hardware. For example, processor 220 may include elements or logic adapted to execute software programs and manipulate data structures 245, which may reside in memory 240.

Sensors 260 typically operate in conjunction with processor 220 to perform measurements, and can include special-purpose processors, detectors, transmitters, receivers, and the like. In this fashion, sensors 260 may include hardware/software for generating, transmitting, receiving, detection, logging, and/or sampling magnetic fields, seismic activity, and/or acoustic waves, temperature, pressure, or other parameters.

Memory 240 comprises a plurality of storage locations that are addressable by processor 220 for storing software programs and data structures 245 associated with the embodiments described herein. An operating system 242, portions of which may be typically resident in memory 240 and executed by processor 220, functionally organizes the device by, inter alia, invoking operations in support of software processes and/or services 244 executing on controller 200. These software processes and/or services 244 may perform processing of data and communication with controller 200, as described herein. Note that while process/service 244 is shown in centralized memory 240, some examples provide for these processes/services to be operated in a distributed computing network.

It will be apparent to those skilled in the art that other processor and memory types, including various computer-readable media, may be used to store and execute program instructions pertaining to the fluidic channel evaluation techniques described herein. Also, while the description illustrates various processes, it is expressly contemplated that various processes may be embodied as modules having portions of the process/service 244 encoded thereon. In this fashion, the program modules may be encoded in one or more tangible computer readable storage media for execution, such as with fixed logic or programmable logic (e.g., software/computer instructions executed by a processor, and any processor may be a programmable processor, programmable digital logic such as field programmable gate arrays or an ASIC that comprises fixed digital logic. In general, any process logic may be embodied in processor 220 or computer readable medium encoded with instructions for execution by processor 220 that, when executed by the processor, are operable to cause the processor to perform the functions described herein.

Figure 3:
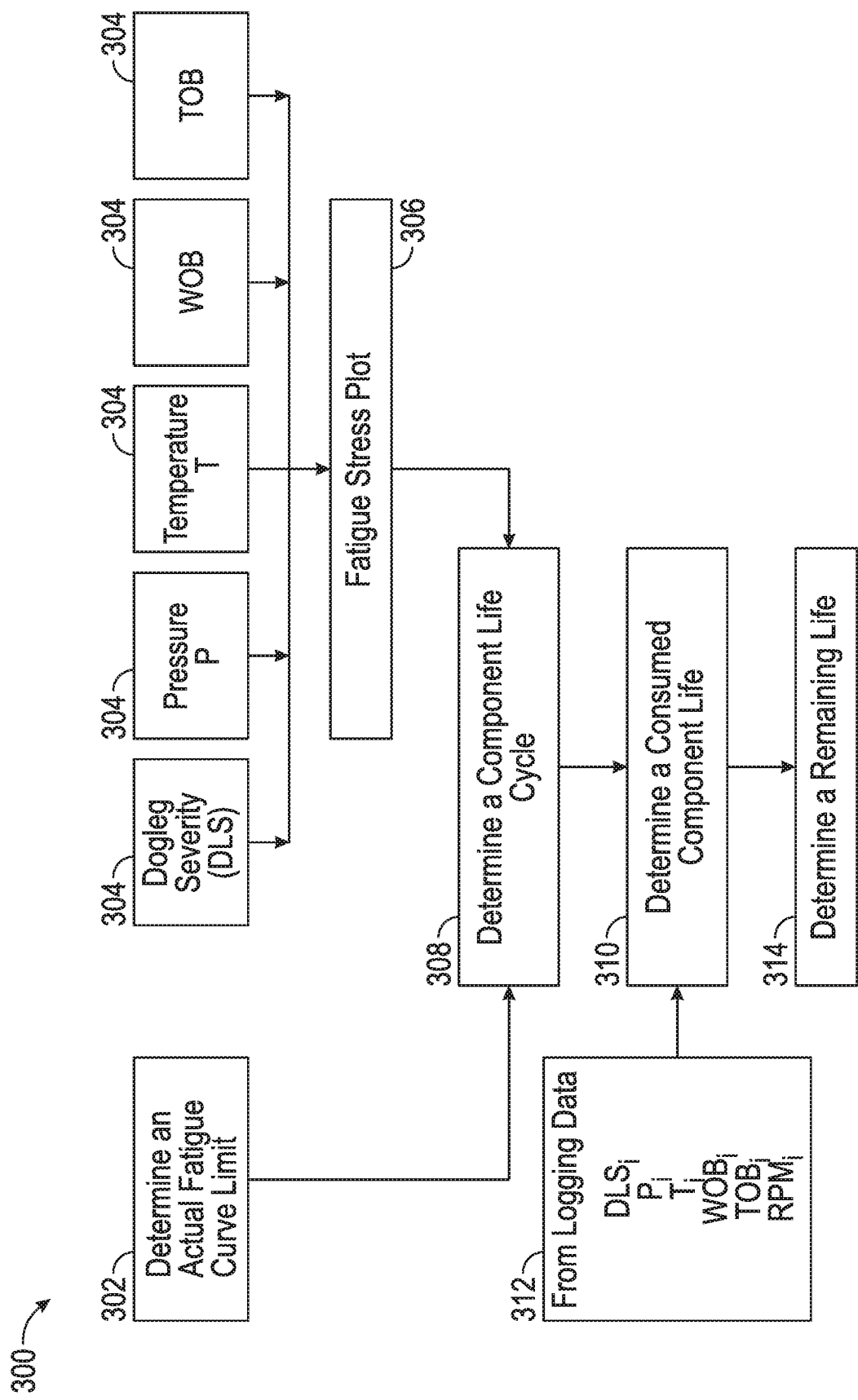
FIG. 3 is a flow chart illustrating an example of a drilling system that may be used in accordance with the present disclosure.

Referring to FIG. 3, a flowchart is presented in accordance with an example embodiment. The method 300 is provided by way of example, as there are a variety of ways to carry out the method. The method 300 described below can be carried out using the configurations illustrated in FIGS. 1-2 and 4, for example, and various elements of these figures are referenced in explaining example method 300. Each block shown in FIG. 3 represents one or more processes, methods or subroutines, carried out in the example method 300. Furthermore, the illustrated order of blocks is illustrative only and the order of the blocks can change according to the present disclosure. Additional blocks may be added or fewer blocks may be utilized, without departing from this disclosure. The example method 300 can begin at block 302.

As the wellbore 126 is being drilled utilizing the drilling components, the drilling components are subject to multiple downhole stresses due to the drilling parameters such as dogleg severity, pressure, temperature, weight on bit, torque on bit, and/or rotations per minute. The drilling parameters may cause wear and tear on the drilling components, affecting the life cycle of each of the drilling components.

To determine the component life cycle of each of the drilling components and determine the remaining life of each of the drilling components during drilling, at block 302, the actual yield strength of the material of the drilling component is input into the controller. The controller then determines the actual fatigue curve limit for mean stress $\sigma_M$ and alternative stress $\sigma_A$ from the actual material yield strength $S_Y$: $(\sigma_M, \sigma_A)=f(S_Y)$. For example, the actual fatigue curve limit can be determined using the Gerber limit curve. By utilizing the actual fatigue curve limit based on the actual material yield strength, the determined component life cycle is more accurate.

Figure 4:
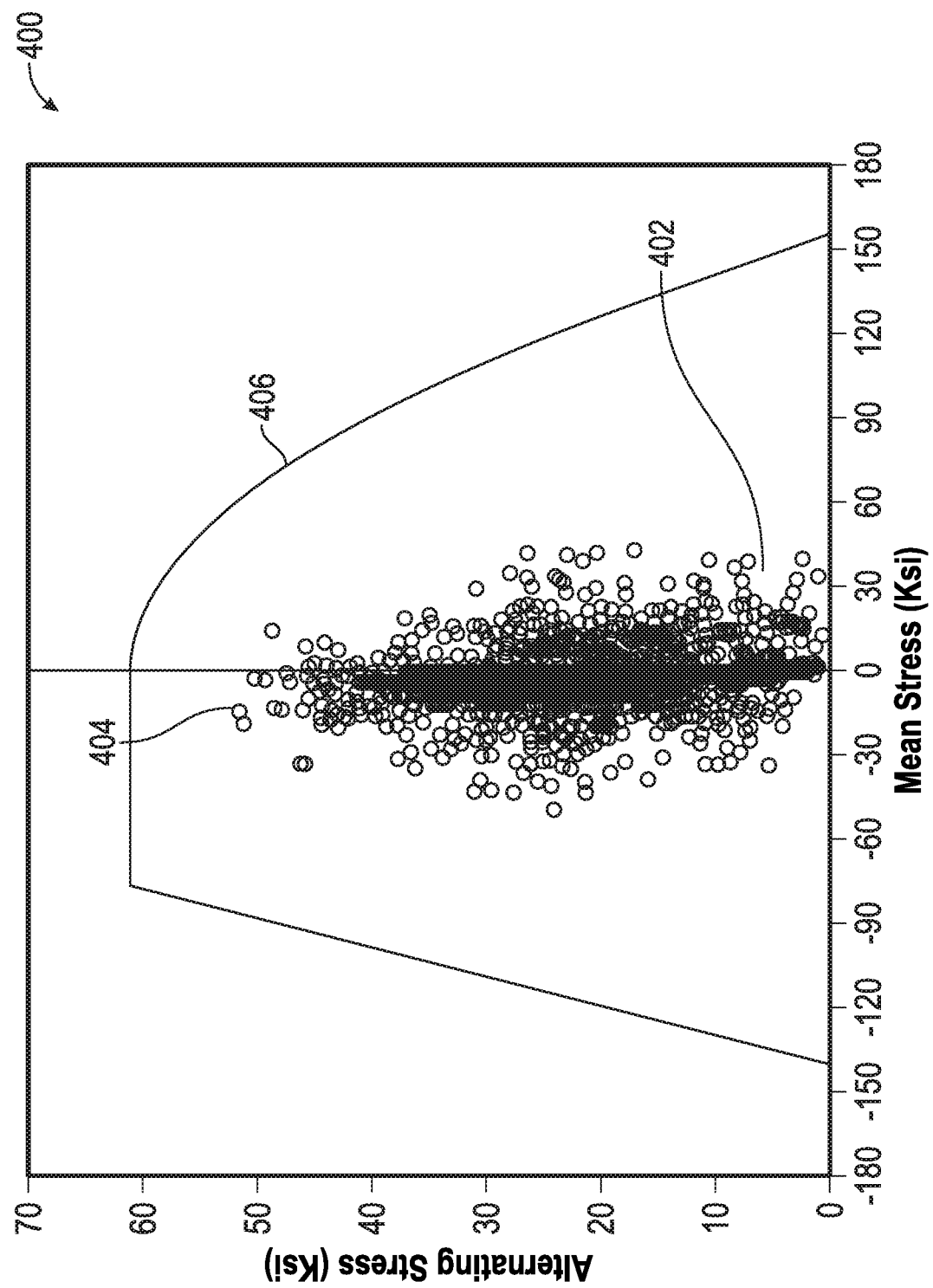
FIG. 4 illustrates an exemplary fatigue stress plot.

At block 304, the controller simulates a plurality of drilling parameters for the drilling component to determine one or more estimated stresses enacted on the drilling component for one or more combinations of the plurality of drilling components. As illustrated in FIG. 3, the plurality of drilling parameters can include at least two of: dogleg severity, pressure, temperature, weight on bit, and/or torque on bit. By utilizing one or more combinations of multiple drilling parameters, the determined component life cycle is more accurate. Using the plurality of drilling parameters, at block 306, a fatigue stress plot is determined. FIG. 4 illustrates an exemplary fatigue stress plot 400 including an exemplary actual fatigue curve limit 406. Simulated data 402 includes the plurality of drilling parameters which enact stresses on the drilling components. The highest stress point 404 is used to determine the maximum number of life cycles that each of the drilling components can endure before needing replacement.

Referring back to FIG. 3, at block 308, a component life cycle of each of the drilling components is determined. The component life cycle is based on the actual fatigue curve limit and the plurality of simulated drilling parameters. The component life cycle includes the maximum number of cycles $N_{MAX}$ of drilling steps that the drilling component can withstand before needing replacement.

As drilling of the wellbore proceeds, a consumed component life of the drilling component is determined at block 310. The consumed component life of the drilling component is based on actual drilling parameters. The actual drilling parameters, at block 312, can be obtained from sensors disposed downhole and/or provided on the surface which measure the actual drilling parameters. The actual drilling parameters can include, for example, at least one of: doglog severity, pressure, temperature, weight on bit, torque on bit, and/or rotations per minute. The actual drilling parameters can be provided in real time such that the consumed component life can be determined in real time to avoid component failure while maximizing the use of the drilling components.

For example, the consumed component life can be calculated for actual drilling step i by:

$$L_{eqv,i}=(\Delta t \times RPM_i)/N_{MAX,i},$$

where $\Delta t$ is the time step of the logging data, $RPM_i$ is the rotation speed of that actual drilling step I, and $N_{MAX}$ is the component life cycle with the maximum number of cycles for the specific set of drilling parameters of drilling step i.

At block 314, a remaining life of the drilling component is determined after the actual drilling step. The remaining life can be determined by subtracting the consumed component life from the component life cycle. For example, a simulated drilling step of the component life cycle may be considered 1, and the component life cycle of the drilling component may be 100. After an actual drilling step, if the conditions downhole are lesser than simulated, for example lower temperature and/or lower pressure, then the consumed component life for the actual drilling step may be determined to be 0.7. As such, the remaining life of the drilling component is 99.3. This is repeated for each actual drilling step. Once the remaining life is less than a predetermined amount, for example 8 in the aforementioned example, then the drilling component may be replaced, maximizing the utilization efficiency of the drilling components.

Numerous examples are provided herein to enhance understanding of the present disclosure. A specific set of statements are provided as follows.

Statement 1: A method is disclosed comprising: determining an actual fatigue curve limit for actual stress of a drilling component based on an actual yield strength of a material of the drilling component; simulating a plurality of drilling parameters for the drilling component to determine one or more estimated stresses enacted on the drilling component for one or more combinations of the plurality of drilling parameters; determining a component life cycle of the drilling component based on the actual fatigue curve limit and the plurality of drilling parameters; determining a consumed component life of the drilling component for an actual drilling step utilizing the drilling component; and determining a remaining life of the drilling component after the actual drilling step.

Statement 2: A method is disclosed according to Statement 1, further comprising: replacing the drilling component when the remaining life of the drilling component is less than a predetermined amount.

Statement 3: A method is disclosed according to Statements 1 or 2, wherein the plurality of drilling parameters includes at least two selected from the group of: dogleg severity, pressure, temperature, weight on bit, and torque on bit.

Statement 4: A method is disclosed according to any of preceding Statements 1-3, wherein determining the consumed component life includes measuring, by one or more sensors, actual drilling parameters.

Statement 5: A method is disclosed according to Statement 4, wherein the actual drilling parameters include at least one selected from the group of: dogleg severity, pressure, temperature, weight on bit, torque on bit, and rotations per minute.

Statement 6: A method is disclosed according to any of preceding Statements 1-5, wherein a plurality of drilling components includes the drilling component, the plurality of drilling components includes at least one selected from the group of: one or more drill collars, a drill bit, and housings for one or more downhole tools.

Statement 7: A method is disclosed according to any of preceding Statements 1-6, wherein determining the remaining life includes subtracting the consumed component life from the component life cycle.

Statement 8: A method is disclosed according to any of preceding Statements 1-7, further comprising: drilling a wellbore utilizing the drilling component.

Statement 9: A system is disclosed comprising: a drill string including a drilling component, the drilling component including a material having an actual yield strength, the drill string operable to drill a wellbore; one or more sensors operable to measure actual drilling parameters during the drilling of the wellbore; a processor coupled with the one or more sensors; and a memory configured to store instructions executable by the processor, the instructions, when executed, are operable to: determine an actual fatigue curve limit for actual stress of the drilling component based on the actual yield strength of the material of the drilling component; simulate a plurality of drilling parameters for the drilling component to determine one or more estimated stresses enacted on the drilling component for one or more combinations of the plurality of drilling parameters; determine a component life cycle of the drilling component based on the actual fatigue curve limit and a plurality of drilling parameters; determine a consumed component life of the drilling component based on the actual drilling parameters for an actual drilling step utilizing the drilling component; and determine a remaining life of the drilling component after the actual drilling step.

Statement 10: A system is disclosed according to Statement 9, wherein the drilling component is replaced when the remaining life of the one or more of the drilling components is less than a predetermined amount.

Statement 11: A system is disclosed according to Statements 9 or 10, wherein the plurality of drilling parameters includes at least two selected from the group of: dogleg severity, pressure, temperature, weight on bit, and torque on bit.

Statement 12: A system is disclosed according to any of preceding Statements 9-11, wherein the actual drilling parameters include at least one selected from the group of: dogleg severity, pressure, temperature, weight on bit, torque on bit, and rotations per minute.

Statement 13: A system is disclosed according to any of preceding Statements 9-12, wherein a plurality of drilling components includes the drilling component, the plurality of drilling components includes at least one selected from the group of: one or more drill collars, a drill bit, and housings for one or more downhole tools.

Statement 14: A system is disclosed according to any of preceding Statements 9-13, wherein the material is non-magnetic.

Statement 15: A system is disclosed according to Statement 14, wherein the material is stainless steel.

Statement 16: A system is disclosed according to any of preceding Statements 9-15, wherein the remaining life is determined by subtracting the consumed component life from the component life cycle.

Statement 17: A non-transitory computer readable storage medium is disclosed comprising at least one processor and storing instructions executable by the at least one processor to: determine an actual fatigue curve limit for actual stress of a drilling component based on an actual yield strength of a material of the drilling component; simulate a plurality of drilling parameters for the drilling component to determine one or more estimated stresses enacted on the drilling component for one or more combinations of the plurality of drilling parameters; determine a consumed component life of the drilling component for an actual drilling step utilizing the drilling component; and determine a remaining life of the drilling component after the actual drilling step.

Statement 18: A non-transitory computer readable storage medium is disclosed according to Statement 17, further comprising instructions executable by the at least one processor to: provide an alert to replace the drilling component when the remaining life of the drilling component is less than a predetermined amount.

Statement 19: A non-transitory computer readable storage medium is disclosed according to Statements 17 or 18, wherein the plurality of drilling parameters includes at least two selected from the group of: dogleg severity, pressure, temperature, weight on bit, and torque on bit.

Statement 20: A non-transitory computer readable storage medium is disclosed according to any of preceding Statements 17-19, wherein the remaining life is determined by subtracting the consumed component life from the component life cycle.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A method comprising:
   determining an actual fatigue curve limit for actual stress of a drilling component based on an actual yield strength of a material of the drilling component;
   simulating a plurality of drilling parameters for the drilling component to determine one or more estimated stresses enacted on the drilling component for one or more combinations of the plurality of drilling parameters;
   determining a component life cycle of the drilling component based on the actual fatigue curve limit and the plurality of drilling parameters;
   determining a consumed component life of the drilling component that is consumed during an actual drilling step utilizing the drilling component in drilling a wellbore, wherein the consumed component life is determined from measurements made by one or more sensors during the drilling of the wellbore based on a function of a time step during which the measurements are gathered, a rotation speed associated with the drilling component during the actual drilling step, and a maximum number of cycles for the plurality of drilling parameters for the drilling component; and
   determining a current remaining life of the drilling component after the actual drilling step based on the consumed component life in relation to the component life cycle;
   updating the component life cycle to indicate the current remaining life of the drilling component for further determining a remaining life of the drilling component after one or more subsequent drilling steps that utilize the drilling component.

2. The method of claim 1, further comprising: replacing the drilling component when the remaining life of the drilling component is less than a predetermined amount, wherein the remaining life of the drilling component is either the current remaining life of the drilling component or the remaining life of the drilling component after the one or more subsequent drilling steps.

3. The method of claim 1, wherein the plurality of drilling parameters includes at least two selected from the group of: dogleg severity, pressure, temperature, weight on bit, and torque on bit.

4. The method of claim 1, wherein determining the consumed component life includes measuring, by the one or more sensors, actual drilling parameters.

5. The method of claim 4, wherein the actual drilling parameters include at least one selected from the group of: dogleg severity, pressure, temperature, weight on bit, torque on bit, and rotations per minute.

6. The method of claim 1, wherein a plurality of drilling components includes the drilling component, the plurality of drilling components includes at least one selected from the group of: one or more drill collars, a drill bit, and housings for one or more downhole tools.

7. The method of claim 1, wherein determining the current remaining life includes subtracting the consumed component life from the component life cycle.

8. The method of claim 1, further comprising: drilling a wellbore utilizing the drilling component.

9. A system comprising:
   a drill string including a drilling component, the drilling component including a material having an actual yield strength, the drill string operable to drill a wellbore;
   one or more sensors operable to measure actual drilling parameters during the drilling of the wellbore;
   a processor coupled with the one or more sensors; and
   a memory configured to store instructions executable by the processor, the instructions, when executed, are operable to:
      determine an actual fatigue curve limit for actual stress of the drilling component based on the actual yield strength of the material of the drilling component;
      simulate a plurality of drilling parameters for the drilling component to determine one or more estimated stresses enacted on the drilling component for one or more combinations of the plurality of drilling parameters;
      determine a component life cycle of the drilling component based on the actual fatigue curve limit and the plurality of drilling parameters;
      determine a consumed component life of the drilling component that is consumed during an actual drilling step utilizing the drilling component in drilling a wellbore, wherein the consumed component life is determined from measurements made by one or more sensors during the drilling of the wellbore based on a function of a time step during which the measurements are gathered, a rotation speed associated with the drilling component during the actual drilling step, and a maximum number of cycles for the plurality of drilling parameters for the drilling component; and
      determine a current remaining life of the drilling component after the actual drilling step based on the consumed component life in relation to the component life cycle;
   updating the component life cycle to indicate the current remaining life of the drilling component for further determining a remaining life of the drilling component after one or more subsequent drilling steps that utilize the drilling component.

10. The system of claim 9, wherein the drilling component is replaced when the remaining life of the one or more of the drilling components is less than a predetermined amount and the remaining life of the drilling component is either the current remaining life of the drilling component or the remaining life of the drilling component after the one or more subsequent drilling steps.

11. The system of claim 9, wherein the plurality of drilling parameters includes at least two selected from the group of: dogleg severity, pressure, temperature, weight on bit, and torque on bit.

12. The system of claim 9, wherein the actual drilling parameters include at least one selected from the group of: dogleg severity, pressure, temperature, weight on bit, torque on bit, and rotations per minute.

13. The system of claim 9, wherein a plurality of drilling components includes the drilling component, the plurality of drilling components includes at least one selected from the group of: one or more drill collars, a drill bit, and housings for one or more downhole tools.

14. The system of claim 9, wherein the material is non-magnetic.

15. The system of claim 14, wherein the material is stainless steel.

16. The system of claim 9, wherein the current remaining life is determined by subtracting the consumed component life from the component life cycle.

17. A non-transitory computer readable storage medium comprising at least one processor and storing instructions executable by the at least one processor to:
  determine an actual fatigue curve limit for actual stress of a drilling component based on an actual yield strength of a material of the drilling component;
  simulate a plurality of drilling parameters for the drilling component to determine one or more estimated stresses enacted on the drilling component for one or more combinations of the plurality of drilling parameters;
  determine a component life cycle of the drilling component based on the actual fatigue curve limit and the plurality of drilling parameters;
  determine a consumed component life of the drilling component that is consumed during an actual drilling step utilizing the drilling component in drilling a wellbore, wherein the consumed component life is determined from measurements made by one or more sensors during the drilling of the wellbore based on a function of a time step during which the measurements are gathered, a rotation speed associated with the drilling component during the actual drilling step, and a maximum number of cycles for the plurality of drilling parameters for the drilling component; and
  determine a current remaining life of the drilling component after the actual drilling step based on the consumed component life in relation to the component life cycle;
  updating the component life cycle to indicate the current remaining life of the drilling component for further determining a remaining life of the drilling component after one or more subsequent drilling steps that utilize the drilling component.

18. The non-transitory computer readable storage medium of claim 17, further comprising instructions executable by the at least one processor to: provide an alert to replace the drilling component when the remaining life of the drilling component is less than a predetermined amount, wherein the remaining life of the drilling component is either the current remaining life of the drilling component or the remaining life of the drilling component after the one or more subsequent drilling steps.

19. The non-transitory computer readable storage medium of claim 17, wherein the plurality of drilling parameters includes at least two selected from the group of: dogleg severity, pressure, temperature, weight on bit, and torque on bit.

20. The non-transitory computer readable storage medium of claim 17, wherein the current remaining life is determined by subtracting the consumed component life from the component life cycle.

* * * * *